United States Patent [19]

Azkona

[11] Patent Number: 4,740,118
[45] Date of Patent: Apr. 26, 1988

[54] SELF-OPENING DIESTOCK

[75] Inventor: Manuel Azkona, Hondarribia, Spain

[73] Assignee: Super-Ego Tools, S.A., Spain

[21] Appl. No.: 864,007

[22] Filed: May 16, 1986

[30] Foreign Application Priority Data

May 22, 1985 [ES] Spain ............................ 286927

[51] Int. Cl.⁴ .................... B23B 39/00; B23G 1/00
[52] U.S. Cl. ................... 408/73; 408/154; 408/158; 10/111; 10/123 R
[58] Field of Search ............ 408/147, 154, 153, 157, 408/158, 172, 186, 146, 148, 73, 74; 10/111, 123 R

[56] References Cited

U.S. PATENT DOCUMENTS

| | | | |
|---|---|---|---|
| 1,148,510 | 8/1915 | Gates | 408/158 |
| 1,224,795 | 5/1917 | Roelofson | 408/154 |
| 1,706,104 | 3/1929 | Breitenstein | 408/154 |
| 1,936,274 | 11/1933 | Shafer | 408/172 |
| 2,958,877 | 11/1960 | Strickland | 408/172 |

Primary Examiner—Gil Weidenfeld
Assistant Examiner—Daniel W. Howell
Attorney, Agent, or Firm—Lucas & Just

[57] ABSTRACT

A self-opening diestock which is characterized by the fact that it comprises a rotating operating part which carries the thread-cutting dies that are capable of radial travel and have two grooves in which are accommodated the heads; means for exerting an outward thrust upon the cutting dies; means for restraining the cutting dies, where both said means are embodied onto the operating part; a flange which is capable of axial travel and carries the head of the means for restraining, and a stop piece attached to the flange, which is capable of axial travel, and upon which the end of the pipe to be threaded rests.

5 Claims, 1 Drawing Sheet

SELF-OPENING DIESTOCK

This invention is concerned with a self-opening diestock which is characterized inasmuch that it comprises:
(a) a revolving operating part that carries:
(b) the cutting dies which are capable of radial travel and have two grooves in which are accommodated the heads of:
(b1) means for thrusting the cutting dies outwards;
(b2) means for restraining the cutting dies, where both said means are embodied onto said operating part;
(c) a flange which is capable of axial travel and which carries the head of said means for restraining;
(d) a stop piece attached to the flange, which is capable of axial travel, and upon which the end of the pipe to be threaded rests.

It is also characterized because said means for thrusting are comprised of pivots or washers in continuity, which are housed in one or more circumferential slots, and whose heads push upon the cutting dies through the effect of a spring, where said heads are shaped so as to fit into the slots on the cutting dies.

It is also characterized because said means for restraining are comprised of a head with an end whose walls are shaped so as to oppose the stresses from said means for thrusting, and extend in the form of a slope to enable the shape of the head to engage inside the slots on the cutting dies.

Figure 1:
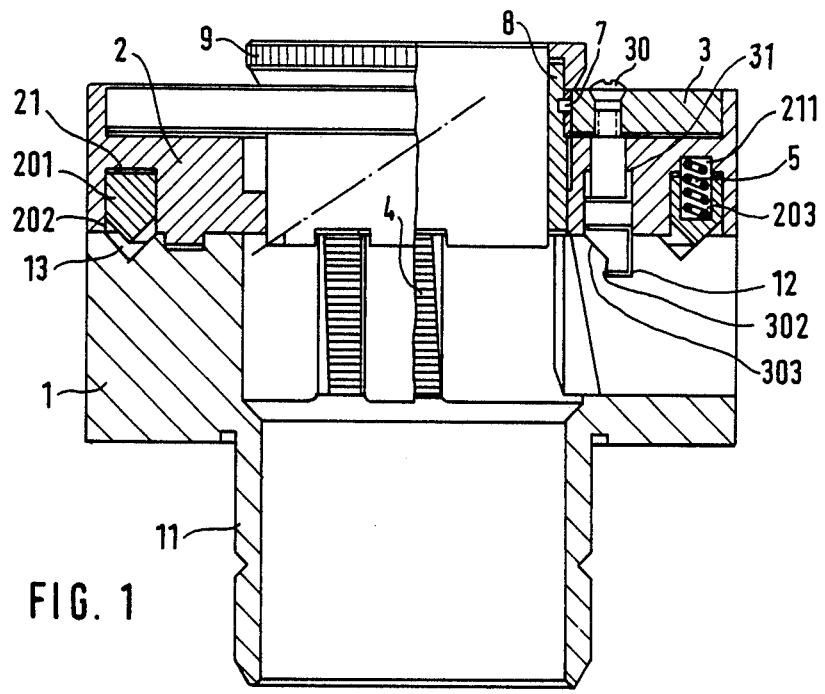
FIG. 1 shows a partial front elevational section of the "SELF-OPENING STOCK" that is covered by this invention.
Figure 2:
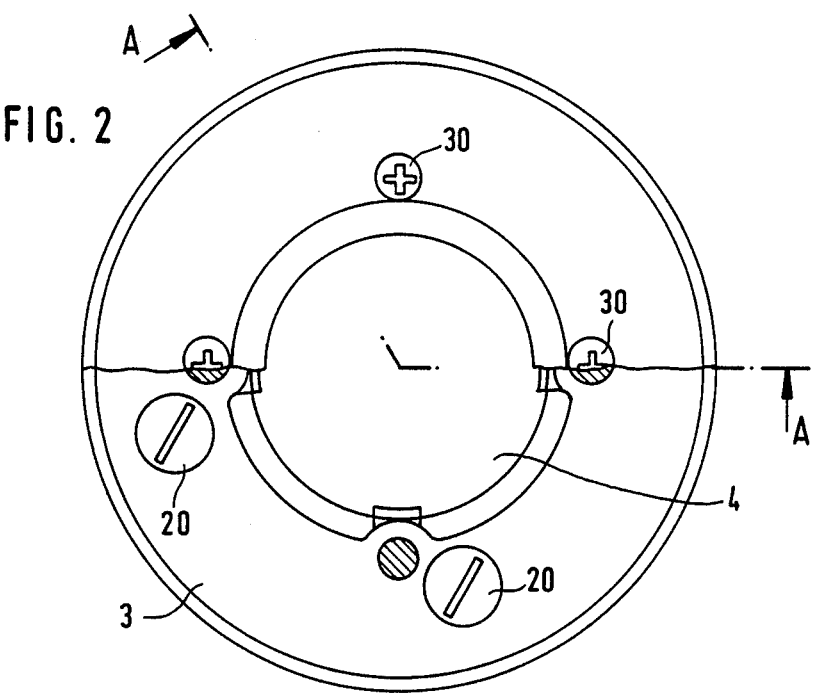
FIG. 2 shows a top view of the SELF-OPENING STOCK that is covered by this invention.

The "SELF-OPENING STOCK" with which this invention is concerned is made up of: an operating part (1) (2) which comprises:
a driving part (1);
a driven part (2);
and moreover it comprises:
a rear flange (3);
diestocks (4);
means (20) (30) for positioning said driven part (2); and rear flange (3) in said driving part (1).

The driving part (1) is preferably a single body piece possessing a hole in the center to accommodate the diestock (4), and an extension shaft (11) upon which a rotor-motor (not illustrated) can be fitted to drive it in a rotating motion.

Sets of slots (12), (13) are arranged on the rear face of said driving part (1), for accommodating the positioning means (20), (30) described hereunder.

In the construction as illustrated in the Figures, the set of slots (12) possesses at least one generatrix in a slope of two angular lengths (302), (303) of different gradients.

In the construction as illustrated in the Figures, the set of slots (13) possesses a tapering shape.

The driven part (2) is fitted with flange (3) upon its rear where driven part (2) is secured by means (30) to rear flange (3), while the front surface of driven part (2), which is facing said driving part (1), possesses grooves (21), (31) which are respectively facing grooves (12), (13) in body (1). Body (1) accommodates the positioning means (20) (30) described hereunder.

In the construction as illustrated in the Figures, the positioning means (20) between the driving (1) and the driven (2) part, consists of a continuous washer, or it is a set of pivots (201) with a tapered head (202) and whose body possesses a slot (203) in which there is accommodated a spring (5) to exert pressure upon said washer or pivots (201) and a continuous outward thrust upon the diestocks (4).

In the construction as illustrated, the positioning means (30) is a set of pivots with screw-heads which go through flange (3) and driven part (2) and are accommodated in slot (12) of body (1).

Said means (30) have, at their innermost end which is housed inside slot (12), at least one generatrix. The generatrix has a slope of two angular lengths (302) (303) with different gradients (see FIG. 1).

Alternatively, but without affecting the essential features of the model in any way at all, pivot joints (20), (30) may be comprised in a single perimetrical part, in which case the respective slots (12), (13) of driving portion (1), and (21), (31) of driven portion (2) will likewise be perimetrical, and they will all, in any event, conserve the same section and functionality.

Flange (3) is joined by conventional means to a sleeve (8), and the assembly is completed with a head (9).

When the end of the pipe which is to be threaded by the thread-cutting diestock (4) comes into abutment with sleeve (8) or similar components and pushes them, it causes a similar motion to be undergone by flange (3), and hence by positioning means (30). When, in the course of this motion, the bottom edge of positioning piece (30) reaches slope (302) in slot (12), the thread-cutting diestock (4) is able to shift outwards due to the continuous pressure exerted thereupon by washer or pivot (201).

As is evident, the pipe or workpiece to be threaded by the thread-cutting diestock (4) is inserted through shaft (11).

I claim:

1. A self-opening thread cutting tool comprising a revolving operating part that carries a plurality of cutting-dies which are capable of radial travel and have two grooves in which are engaged by, respectively, means for thrusting the cutting dies radially outward, and means for restraining the cutting dies from so moving, with both said means being carried by a driven part fixed to said operating part; a flange which is capable of axial travel, and which carries the head of said restraining means; and a stop piece attached to the flange, which is capable of axial travel, and upon which the end of the pipe to be threaded pushes.

2. A tool according to claim 1 wherein said thrust means are comprised by continuous washers or by spring loaded spigots which are housed in one or more circumferential grooves, and whose heads push upon the cutting dies through the effect of a spring, said heads being shaped so as to fit into inclined grooves on the cutting dies.

3. A self-opening diestock according to claim 2 wherein said restraining means are comprised of a spigot with an end whose walls are shaped so as to oppose the stresses from said thrust means, and extend in the form of a ramp to engage a corresponding inside the grooves on the cutting dies.

4. A self-opening die holder which is characterized by the fact that it comprises a rotating housing which carries a set of thread-cutting dies that are capable of radial travel and have two grooves in which are accommodated the heads respectively of means for resiliently exerting an outward thrust upon the cutting dies, and means for restraining the cutting dies in their inner working positions, where both said means are embodied in the housing; an end flange which is capable of axial travel and carries the head of the said restraining means, and a stop piece attached to the flange, which is capable of axial travel, and upon which the end of the workpiece to be threaded pushes to effect release of said restraining means and opening of said dies as resiliently urged outwardly by said thrust means.

5. A thread-cutting tool and in particular a rotatable holder which mounts thread-cutting dies which are self opening, comprising in combination:
   (a) a holder with an axial through opening, the holder being adapted to be rotated around a workpiece, on the end of which it is desired to form a thread;
   (b) there being mounted in the holder and movable radially therein, a set of thread cutting dies which in their normal innermost working disposition are adapted to cut a thread on the workpiece inserted through the holder;
   (c) these dies having formed on faces threof at right angles to the rotational axis, at least two grooves;
      one of these grooves being engaged by spring loaded thrust means which is arranged to tend to urge each die radially outwardly;
      and the other groove being ramped and engaged by the correspondingly ramped end of a spigot whose remote head end is fixed to an end flange of the holder;
   (d) this end flange being axially movable progressively to withdraw the ramped spigot end from the correspondingly ramped groove in each thead cutting die; this allowing that dies to move radially outwardly, as urged by the spring loaded thrust means engaging its other proove; and
   (e) the said axial movement of the end flange being effected by thrust from the end of the pipe or other workpiece emerging from the thread-cutting dies, and outward movement of the dies disengaging them from the workpiece.

* * * * *

UNITED STATES PATENT AND TRADEMARK OFFICE
CERTIFICATE OF CORRECTION

PATENT NO. : 4,740,118
DATED : April 26, 1988
INVENTOR(S) : Manuel Azkona

It is certified that error appears in the above-identified patent and that said Letters Patent are hereby corrected as shown below: On The Title Page:

In the Abstract, line 10, change "attrached" to --attached--.

Column 4, line 3, change "threof" to --thereof--.

Column 4, line 14, change "thead" to --thread--.

Column 4, line 17, change "proove" to --groove--.

Signed and Sealed this

Eighteenth Day of October, 1988

Attest:

DONALD J. QUIGG

*Attesting Officer*      *Commissioner of Patents and Trademarks*